United States Patent
Kim et al.

(10) Patent No.: US 7,171,285 B2
(45) Date of Patent: Jan. 30, 2007

(54) MOBILE ROBOT USING IMAGE SENSOR AND METHOD FOR MEASURING MOVING DISTANCE THEREOF

(75) Inventors: Se Wan Kim, Seoul (KR); Chan Hee Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 214 days.

(21) Appl. No.: 10/697,282

(22) Filed: Oct. 31, 2003

(65) Prior Publication Data
US 2004/0210343 A1 Oct. 21, 2004

(30) Foreign Application Priority Data
Apr. 3, 2003 (KR) .................. 10-2003-0021133

(51) Int. Cl.
*G06F 19/00* (2006.01)
(52) U.S. Cl. .............. 700/245; 382/107; 382/151; 382/154; 382/159; 382/226; 382/278; 348/47; 348/94; 701/2; 701/23; 701/31; 73/1.22; 73/29.1
(58) Field of Classification Search ........... 700/245
See application file for complete search history.

(56) References Cited

U.S. PATENT DOCUMENTS

| | | | |
|---|---|---|---|
| 4,628,453 A | 12/1986 | Kamejima et al. | |
| 4,969,036 A | 11/1990 | Bhanu et al. | |
| 5,491,670 A * | 2/1996 | Weber | 367/127 |
| 6,253,161 B1 | 6/2001 | Arias-Estrada | |
| 6,296,317 B1 | 10/2001 | Ollis et al. | |
| 6,459,955 B1 * | 10/2002 | Bartsch et al. | 700/245 |
| 6,496,754 B2 * | 12/2002 | Song et al. | 700/245 |
| 6,732,826 B2 | 5/2004 | Song et al. | |
| 6,868,307 B2 * | 3/2005 | Song et al. | 700/245 |

FOREIGN PATENT DOCUMENTS

CN 2156492 2/1994

(Continued)

OTHER PUBLICATIONS

Smith et al., Computation of shape through controlled active exploration, 1994, IEEE, p. 2516-2521.*

(Continued)

*Primary Examiner*—Thomas Black
*Assistant Examiner*—McDieunel Marc
(74) *Attorney, Agent, or Firm*—Greenblum & Bernstein, P.L.C.

(57) ABSTRACT

In a mobile robot and a method for measuring a moving distance thereof, by including an image capture unit for photographing the bottom surface according to motion of a mobile robot at a certain intervals and capturing images; a displacement measurer for measuring displacement about the captured image; and a microcomputer for outputting an actual moving distance by direction and motion of the mobile robot on the basis of the measured displacement value, it is possible to measure an accurate moving distance of the mobile robot with only one image sensor installed at the center of a body of the mobile robot, and accordingly it is possible to simplify a mechanical structure and facilitate maintenance and repairing.

15 Claims, 3 Drawing Sheets

FOREIGN PATENT DOCUMENTS

| | | |
|---|---|---|
| CN | 1299083 | 6/2001 |
| CN | 1381340 | 11/2002 |
| EP | 0390051 | 3/1990 |
| EP | 0390051 | 10/1990 |
| JP | 5-312515 | 11/1993 |
| JP | 7-281752 | 10/1995 |
| JP | 2003-180586 | 7/2003 |
| JP | 2004-148088 | 5/2004 |
| KR | 2004-039093 | 5/2004 |

OTHER PUBLICATIONS

English language abstract of CN 2156492.
English language abstract of CN 1299083.
English language abstract of CN 1381340.
English Language Abstract of JP 2003-180586.
English Language Abstract of JP 2004-148088.
English Language Abstract of JP 5-312515.
English Language Abstract of JP 7-281752.
English Language Abstract of KR 2004-0039093.

* cited by examiner

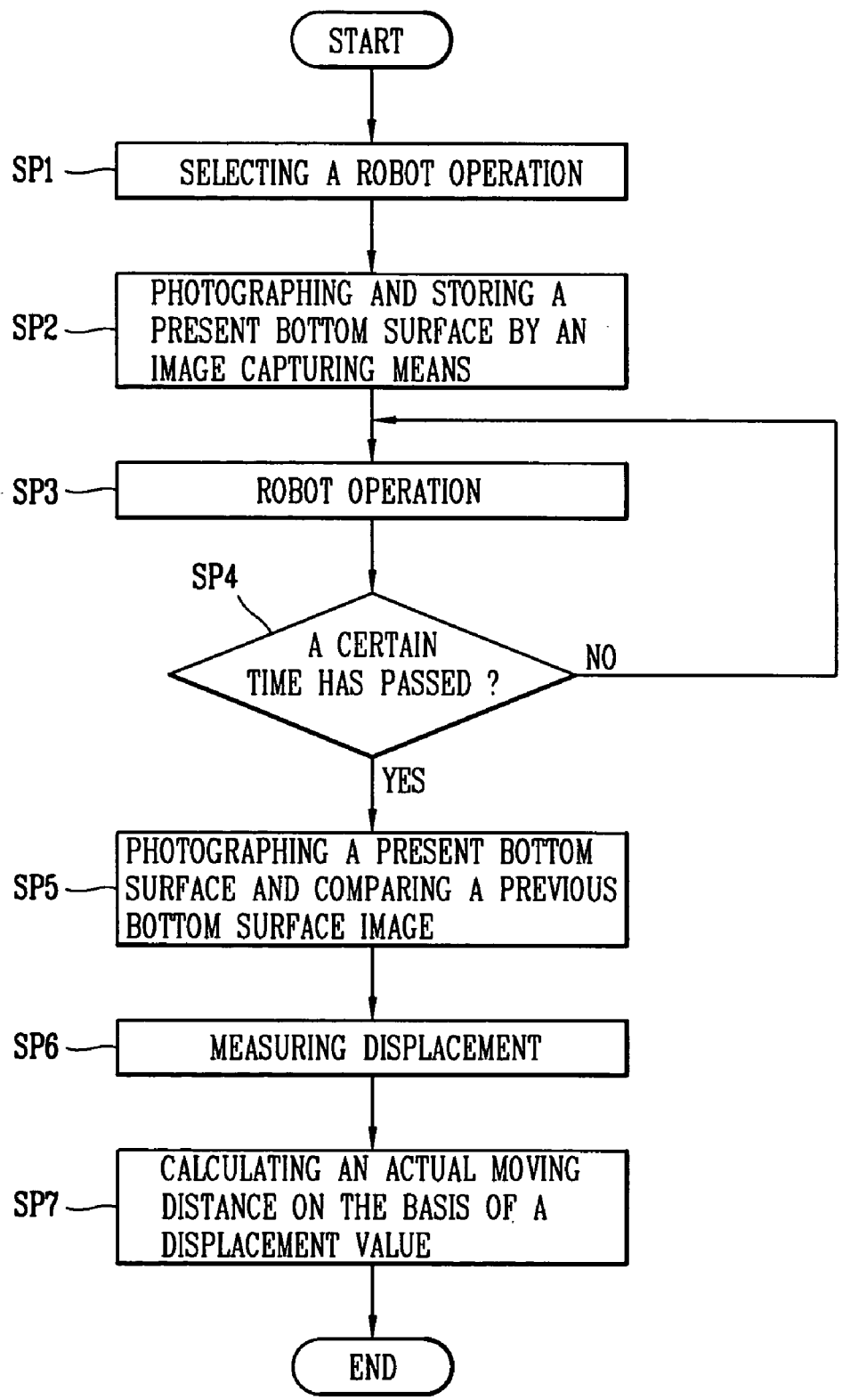

MOBILE ROBOT USING IMAGE SENSOR AND METHOD FOR MEASURING MOVING DISTANCE THEREOF

BACKGROUND OF THE INVENTION

1. Field of the Invention

The present invention relates to a mobile robot, and in particular to a mobile robot and a method for measuring a moving distance thereof capable of measuring a moving distance accurately by calculating direction and motion of a mobile robot with an image sensor.

2. Description of the Related Art

Generally, by using supersonic waves generated by plural supersonic sensors adhered to a mobile robot, the mobile robot can sense a distance or direction through reflected supersonic waves.

A robot vacuum cleaner can be a representative example of the mobile robot. The robot vacuum cleaner cleans a region to be cleaned automatically by sucking impurities such as dust, etc. from the bottom surface while moving the region automatically without being operated by a user. In more detail, the robot vacuum cleaner judges a distance to an obstacle such as furniture, office supplies and a wall, etc. in a cleaning area by using plural supersonic sensors sensing a distance and a direction, and it cleans a cleaning area by switching a direction automatically by operating a left wheel motor and a right wheel motor selectively.

FIG. 1 is a longitudinal-sectional view illustrating the conventional robot vacuum cleaner.

As depicted in FIG. 1, the conventional robot vacuum cleaner includes a fan motor 2 for generating a suction force toward a cleaner main body 1; and a filter container 4 detachably installed at the back of the fan motor 2 in order to collect dust or impurities sucked by the fan motor 2. And, a suction pipe 5 for sucking dust or impurities is installed at the back of the filter container 4, and a suction head 8 for brushing up dust or impurities on the bottom surface 6 is installed at the bottom of the suction pipe 5.

In addition, a pair of moving wheels 9 performable forward/reverse rotation is installed at the bottom of the fan motor 2, and a sub-wheel 10 is installed at the rear of the suction head 8 to support the rear end of the cleaner main body 1. And, a charge terminal unit 12 having a charge terminal 11 is installed at the rear of the cleaner main body 1, and a connection terminal 15 is formed at a power terminal unit 14 installed at an indoor wall 13 so as to be connected with the charge terminal unit 12. Accordingly, when the charge terminal 11 is connected to the connection terminal 15, a charge battery 16 disposed inside the cleaner main body 1 is charged.

In addition, a supersonic sensor 17 for transmitting/receiving supersonic waves is installed at the front center of the cleaner main body 1, and plural supersonic sensors 18 are installed at the left/right of the supersonic sensor 17 at regular intervals to sense obstacles or measure a distance to a target by transmitting supersonic waves and receiving them. And, a luminous unit 19 is installed at the lower portion of the power terminal unit 14 to induce the charge terminal unit 12 to the power terminal unit 14 by generating a light signal, and a light-receiving unit 20 is installed at the lower portion of the charge terminal unit 12 to receive the light signal from the luminous unit 19.

Reference numeral 21 is a control means for controlling various operations of the cleaner, and reference numeral 22 is an exhaust pipe.

The cleaning operation of the conventional robot vacuum cleaner will be described.

First, when a user presses an operation button, power of the charge battery 16 is applied to the fan motor 2, the fan motor 2 is operated, and a suction force is generated at the filter container 4 by the fan motor 2.

Afterward, by the suction force, dust or impurities on the bottom surface 6 is sucked into the suction head 8. The sucked dust or impurities is piled up on the filter 3 through the suction pipe 5. In addition, the control means 21 operates the moving wheels 9 by a control signal, and accordingly the cleaner main body 1 performs cleaning in a requested area while moving.

In the meantime, while performing the automatic cleaning operation, when a voltage level of the charge battery 16 is lower than a certain set level, the control means 21 stops cleaning operation. And, the control means 21 stores a present position of the cleaner in an internal memory and generates a control signal for returning the cleaner to an initial position according to a returning command preset in the memory.

Accordingly, the cleaner main body 1 is moved to the power terminal unit 14 according to the control signal of the control means 21. Afterward, when the cleaner main body 1 reaches around the power terminal unit 14, the light-receiving unit 20 installed at the lower portion of the charge terminal unit 12 receives a light signal generated by the luminous unit 19 formed at the power terminal unit 14. The control means 21 operates-controls the moving wheel 9 by the light signal received through the light-receiving unit 20, and accordingly the charge terminal unit 12 reaches the power terminal unit 14.

Next, the charge terminal 11 of the charge terminal unit 12 is contacted to the contact terminal 15 of the power terminal unit 14, and accordingly the charge battery of the cleaner main body 1 is charged by power supplied through the power terminal unit 14.

In the meantime, the robot cleaner performs cleaning operation while moving according to map information stored therein, the cleaning operation initially performed by a user's command is performed repeatedly unless layout of a cleaning area is not changed.

However, when layout of the cleaning area is changed and position of an obstacle is changed, in order to control motion, etc. of the robot vacuum cleaner, map has to be changed so as to be appropriate to the changed layout.

FIG. 2 is an exemplary view illustrating cleaning area mapping of a robot vacuum cleaner using beacon in accordance with the conventional art.

As depicted in FIG. 2, in an indoor area in which obstacles exist, the robot vacuum cleaner starts from a start point and moves by avoiding obstacles by using sensors, and accordingly a trace about a moving path is generated. Herein, the robot vacuum cleaner acquires additional information about the indoor area by receiving signals from beacons 41~47 installed at certain portions while moving the indoor area. Accordingly, the robot vacuum cleaner performs mapping of the area on the basis of the moving path trace and the signals received from the beacons.

In the meantime, in order to perform the mapping operation, there is a need to measure a moving distance of the robot vacuum cleaner. Accordingly, the robot vacuum cleaner measures a moving distance by using an encoder for measuring rotation of a motor or an additional wheel separated from the moving wheel. In more detail, the robot vacuum cleaner calculates the number of rotations of the moving wheel by using the encoder or the wheel and multiplying a circumference of the moving wheel by the number of rotations in order to obtain a moving distance thereof.

However, when the moving wheel or the wheel is skidded, although the robot vacuum cleaner is not moved, it is calculated as the robot vacuum cleaner is moved, and accordingly accuracy of moving distance calculation may be lowered. In addition, when a mechanical type odometer is used for a robot vacuum cleaner, even the moving wheel or the wheel is not skidded, error according to wheel rotation is continually accumulated, and accordingly it is difficult to calculate a moving distance of the robot vacuum cleaner accurately. In addition, in the conventional art, by measuring a moving distance by using motion according to a mechanical structure, error may occur due to maintenance problem, impact, dust and moisture.

SUMMARY OF THE INVENTION

In order to solve the above-mentioned problem, it is an object of the present invention to provide a mobile robot and a method for measuring a moving distance thereof capable of calculating a moving distance accurately by measuring direction and motion of a mobile robot with an image sensor.

In order to achieve above-mentioned object, a mobile robot using an image sensor includes an image capture unit for photographing the bottom surface according to motion of a mobile robot at a certain intervals and capturing images; a displacement measurer for measuring displacement about the captured image; and a microcomputer for outputting an actual moving distance by direction and motion of the mobile robot on the basis of the measured displacement value.

In addition, a method for measuring a moving distance of a mobile robot by using an image sensor includes photographing the bottom surface according to motion of a mobile robot at a certain intervals and capturing an image; measuring displacement between the captured images; and outputting an actual moving distance by calculating direction and motion of the mobile robot on the basis of the measured displacement value.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 5 is a flow chart illustrating a method for measuring a moving distance of a robot vacuum cleaner by using an image sensor in accordance with the present invention.

DETAILED DESCRIPTION OF THE PREFERRED EMBODIMENT

Figure 3:
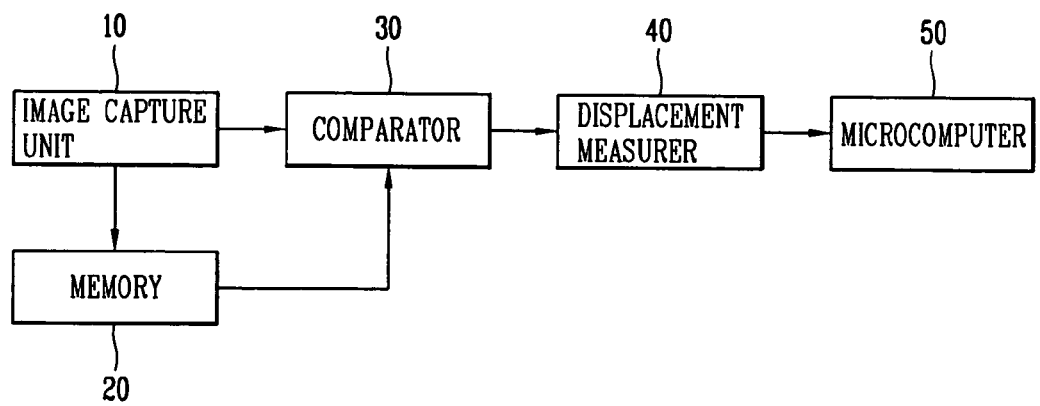
FIG. 3 is a block diagram illustrating a schematic construction of a mobile robot using an image sensor in accordance with the present invention.

FIG. 3 is a block diagram illustrating a schematic construction of a mobile robot using an image sensor in accordance with the present invention.

Figure 4:
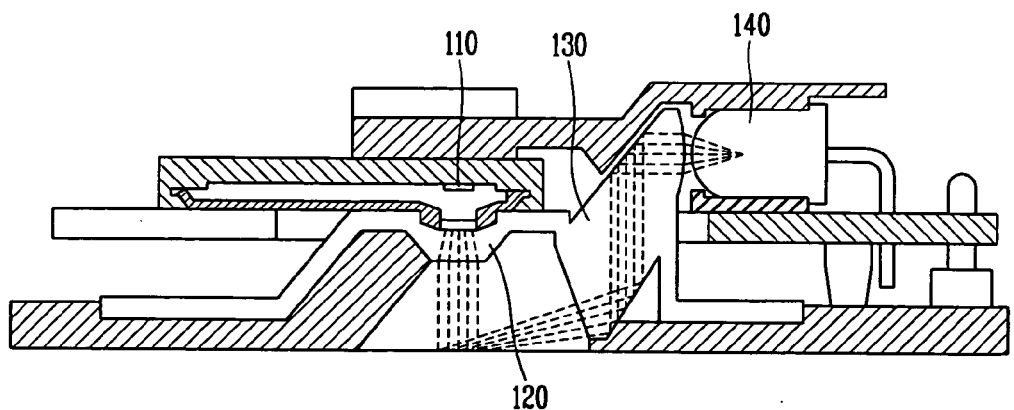
FIG. 4 is an exemplary view illustrating an image capture unit in accordance with the present invention.

FIG. 4 is an exemplary view illustrating an image capture unit in accordance with the present invention.

As depicted in FIGS. 3 and 4, a mobile robot in accordance with the present invention includes an image capture unit 10 for photographing the bottom surface at regular intervals according to motion of the mobile robot and capturing images; a memory 20 for storing images outputted from the image capture unit 10; a comparator 30 for comparing an image outputted from the image capture unit 10 with a previous image stored in the memory 20; a displacement measurer 40 for measuring displacement about the captured image on the basis of a comparison signal outputted from the comparator 30; and a microcomputer 50 for calculating moving direction and motion of the mobile robot on the basis of the displacement value outputted from the displacement measurer 40 and outputting a moving distance.

Figure 1:
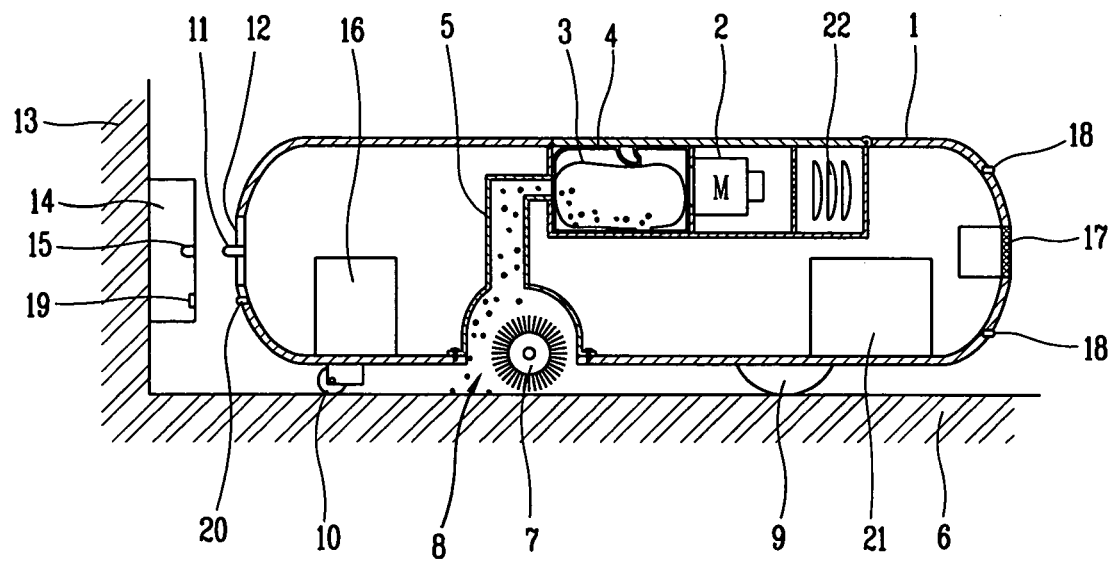
FIG. 1 is a longitudinal-sectional view illustrating the conventional robot vacuum cleaner.
Figure 2:
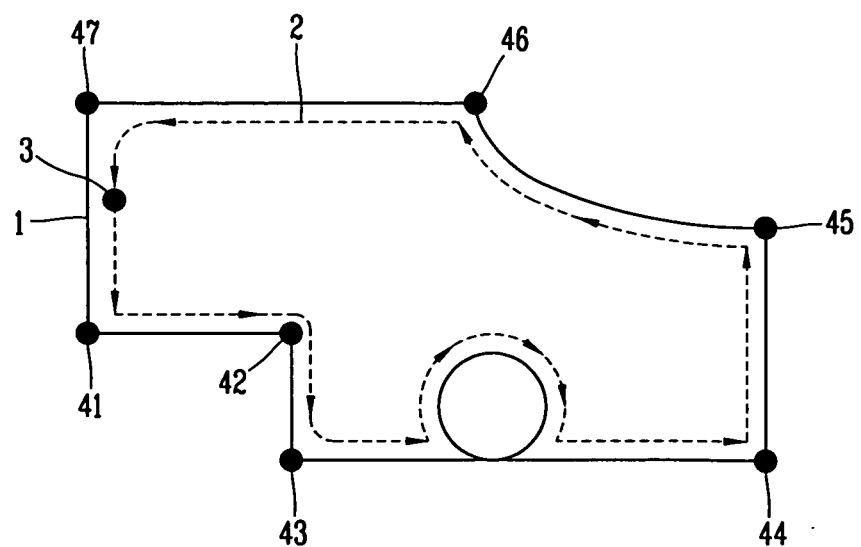
FIG. 2 is an exemplary view illustrating cleaning area mapping of a robot vacuum cleaner using beacons in accordance with the conventional art.

Herein, the image capture unit 10 is installed between the brush 7 and the moving wheel 9 as depicted in FIG. 1, it includes a luminous diode 140 for irradiating light; a light guide 130 for guiding the irradiated light; and an image sensor 110 for sensing intensity variation of light reflected onto the bottom surface through a light lens 120 and capturing an image about the bottom surface.

The operation of the mobile robot using the image sensor in accordance with the present invention will be described.

First, when the luminous diode 140 irradiates light, the light is directively irradiated onto the bottom surface through the light guide 130 formed at the body of the mobile robot. Herein, the irradiated light is reflected in several directions along the bottom surface, and the reflected light is focused through the light lens 120. Accordingly, the image sensor 110 senses intensity change of the light reflected onto the bottom surface and captures an image about the bottom surface. According to that, displacement can be measured by comparing the captured image with a previous image stored in the memory.

Afterward, the microcomputer 50 calculates moving direction and motion of the mobile robot on the measured displacement value and outputs an actual moving distance.

FIG. 5 is a flow chart illustrating a method for measuring a moving distance of a robot vacuum cleaner by using an image sensor in accordance with the present invention.

As depicted in FIG. 5, in the method for measuring a moving distance of a robot vacuum cleaner by using an image sensor in accordance with the present invention, when a user selects an operation command for operating the mobile robot, the image capture unit 10 photographs an image about a present bottom surface, and the captured image is stored in the memory 20 as shown at steps SP1~SP3. Herein, image photographing about the bottom surface is performed repeatedly at a certain intervals.

After a certain time has passed, the comparator 30 compares the present image with a previous image stored in the memory as shown at steps SP4 and SP5.

In the comparison result, where there is image variation between the present image and the previous image, the displacement measurer 40 measures displacement in which a certain reference point is moved on the image as shown at step SP6. In more detail, when the captured images are the same in the comparison result, it is judged the mobile robot is not moved, when there is variation in the captured images, it is judged the mobile robot is moved.

Afterward, the microcomputer 50 calculates direction and motion of the mobile robot on the basis of the measured displacement value and outputs an actual moving distance as shown at step SP7.

The moving distance measuring method in accordance with the present invention will be described in more detail.

About the bottom surface, the image capture unit 10 captures an image of 64-degrees brightness by 1500 frames per second. Accordingly, by comparing/calculating a moving path according to pixel direction of the images and magnitude of movement, a moving distance can be measured. In more detail, in comparing of each frame image, when they are the same, it is judged the mobile robot does not move, when the image is changed, by dividing the pixel moving distance by a certain time, a moving distance can be obtained. For example, by dividing a pixel moved distance by 1/500 sec, a moving distance of the mobile robot can be obtained.

In the meantime, because each pixel receives light reflected onto the bottom surface according to a material of the bottom surface and is discriminated by black and white brightness, a motion can not be missed. For example, although brightness of 1~2 degree is varied in moving, because of resolution as 18*18 pixel, it is easy to judge a motion, and accordingly an actual moving distance of the mobile robot can be accurately recognized without error.

As described-above, in the present invention, by measuring a moving distance with an image sensor regardless of the number of rotations of the moving wheel, it is possible to measure an accurate moving distance even the moving wheel is skidded.

In addition, unlike the conventional art using encoders installed at the left/right moving wheels in measuring of a moving distance, in the present invention, it is possible to measure an accurate moving distance of the mobile robot with only one image sensor installed at the center of the mobile robot, and accordingly it is possible to simplify a mechanical structure and facilitate maintenance and repairing.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile robot comprising:
    an image capturer that captures, at predetermined intervals, images of a bottom surface in accordance with motion of the mobile robot by using an image sensor;
    a memory that stores images output from the image capturer:
    a displacement measurer that measures displacement with respect to the captured image;
    a comparator that compares an image presently output from the image capturer with an image previously stored in the memory; and
    a microcomputer that outputs an actual moving distance by direction and motion of the mobile robot on the basis of a value of the measured displacement and a value of the compared images.

2. The mobile robot of claim 1, wherein the displacement measurer measures a moving path of pixels of an image of each frame output from the comparator.

3. The mobile robot of claim 1, wherein the image capturer captures an image of the bottom surface having 18*18 pixel and 64-degrees brightness by 1500 frames per second.

4. The mobile robot of claim 1, wherein the image capturer includes:
    a luminous diode for irradiating light;
    a light guide for guiding the irradiated light; and
    an image sensor for capturing an image of the bottom surface by sensing an intensity variation of light reflected from the bottom surface through a lens in accordance with motion of the mobile robot.

5. A method for measuring a moving distance of a mobile robot comprising:
    capturing, at predetermined intervals, an image of a bottom surface according to motion of a mobile robot by utilizing an image sensor;
    storing images output from the image capturer in a memory:
    measuring displacement between the captured two images by comparing an image presently output from the image capturer with an image previously stored in the memory; and
    outputting an actual moving distance by calculating direction and motion of the mobile robot on the basis of a value of the measured displacement.

6. The method of claim 5, wherein the capturing comprises dividing the image into a predetermined number of pixels, each pixel receiving light reflected onto the bottom surface according to a material of the bottom surface and is discriminated by black and white brightness.

7. The method of claim 6, wherein the image is captured by 1500 frames per second so as to have 18*18 pixels and 64-degress brightness.

8. The method of claim 7, wherein the actual moving distance is calculated by dividing a pixel moving distance by a predetermined time of about 1/1500 sec.

9. The method of claim 6, wherein the displacement measuring comprises measuring a moving distance according to direction of the pixel and magnitude of movement in the image.

10. The method of claim 5, wherein, in the displacement measuring, when two captured images are the same, it is judged that the mobile robot is not moving, and when two captured images are not the same, it is judged that the mobile robot is moving.

11. The method of claim 5, wherein when two captured images are the same, the mobile robot is determined to not be moving and when two captured images are different, the mobile robot is determined to be moving.

12. A mobile robot comprising:
    an image capturer that captures, at predetermined intervals, images of a predetermined surface based upon motion of the mobile robot, the mobile robot being configured for movement with respect to the predetermined surface;
    a memory that stores images output from the image capturer;
    a displacement measurer that measures displacement in accordance with the captured image;
    a comparator that compares an image presently output from the image capturer with an image previously stored in the memory; and
    a calculator that outputs a moving distance on the basis of a value of the measured displacement and a value of the compared images.

13. The mobile robot of claim 12, the image capturer including an image sensor.

14. The mobile robot of claim 12, wherein the image capturer comprises:
    a luminous diode that radiates light;
    a light guide that guides the light radiated by the luminous diode; and
    an image sensor that captures an image of the predetermined surface by sensing an intensity variation of light reflected by the predetermined surface through a lens in accordance with a motion of the mobile robot.

15. The mobile robot of claim 12, wherein the displacement measurer is configured such that when each of two captured images are the same, it is determined that the mobile robot is not moving and when each of two captured images are not the same, it is determined that the mobile robot is moving.

* * * * *